April 7, 1964 S. PAULL 3,128,389
VARIABLE FREQUENCY MAGNETIC MULTIVIBRATOR
Filed Sept. 18, 1961

INVENTOR
STEPHEN PAULL
BY G. D. O'Brien
Richard J. Keegan
ATTORNEYS

United States Patent Office 3,128,389

Patented Apr. 7, 1964

3,128,389
VARIABLE FREQUENCY MAGNETIC MULTIVIBRATOR

Stephen Paull, Falls Church, Va., assignor to the United States of America as represented by the Administrator of the National Aeronautics and Space Administration Filed Sept. 18, 1961, Ser. No. 139,006
17 Claims. (Cl. 307—88)
(Granted under Title 35, U.S. Code (1952), sec. 266)

Figure 1:
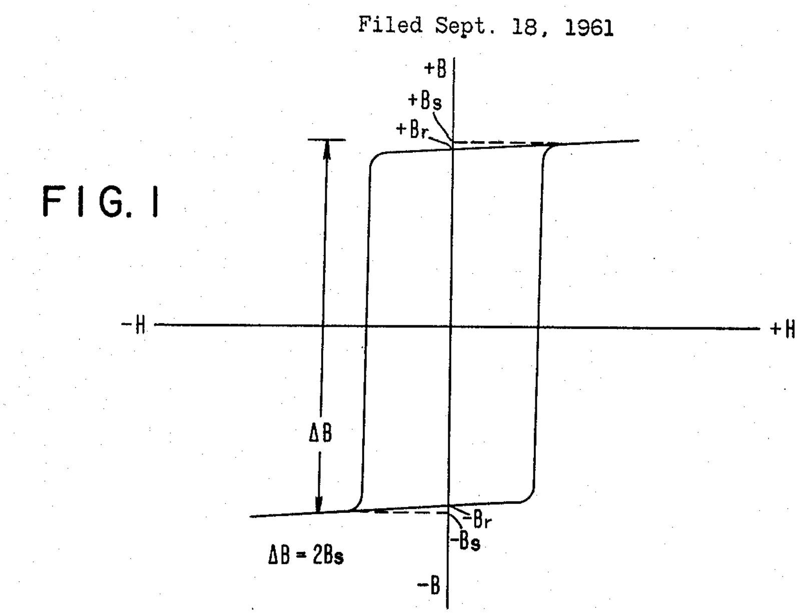

The invention described herein may be manufactured and used by or for the Government of the United States of America for governmental purposes without the payment of royalties thereon or therefor.

This invention relates generally to an improved magnetic-coupled multivibrator, and more particularly to an improved variable frequency magnetic-coupled multivibrator.

This application is a continuation-in-part of a co-pending application of Stephen Paull, Serial No. 14,488, filed March 11, 1960, for a Variable Frequency Magnetic Multivibrator, and assigned to the same assignee.

Although variable frequency magnetic-coupled multivibrator arrangements have been heretofore devised and successfully employed, in general, these prior art arrangements have not been found to be entirely satisfactory. For example, in one prior art multivibrator arrangement, frequency variation is obtained by changing the magnitude of the supply voltage. This arrangement results in undesirable variations in the amplitude and the waveform of the multivibrator output signal. In another present-day arrangement, frequency change is obtained by short-circuiting windings on one or more serially-connected cores. One significant disadvantage of this arrangement is that the frequency of the multivibrator signal can only be varied in discrete steps. Still another prior art variable frequency multivibrator arrangement provides for the application of a variable reversible current to control windings individually linking each core in a push-pull type of multivibrator circuit. The several limitations of this arrangement are the relatively large magnitude of control current required, the non-linearity of the control current-frequency characteristic over a particular frequency band, and the waveform distortion.

These and other disadvantages are overcome by the variable frequency magnetic-coupled multivibrator described and claimed in the aforesaid co-pending application. In one embodiment of that inventive system there is included a plurality of high remanence cores, an electrical energy source, a pair of conductive loops including windings means linking each of the cores and coupled across the energy source, and a frequency control circuit having control winding means coupled to all but one of the plurality of high remanence cores. Each of the conductive loops also contains a transistor switch which is controlled by a group of feedback windings linking said plurality of cores. The transistor switches and feedback windings are arranged to provide the necessary alternative operation of each of the multivibrator's conductive loops. The frequency control circuit contains a control transistor, which is connected across the control winding means, and a variable unidirectional voltage source that sets the level of conduction of the control transistor. The voltages induced in the control winding means in response to a flux change in one direction is limited by the frequency control circuit to the level set by the variable unidirectional voltage source. The degree of voltage limiting thus provided by the frequency control circuit effects the multivibrator's frequency and allows this frequency to be controlled in a linear fashion. While performance satisfactory for many purposes is obtained from the aforementioned variable frequency magnetic-coupled multivibrator, it has been found that improved stability of operation is required especially at the low frequency end of the multivibrator's operation and when the multivibrator is required to operate under adverse conditions of extreme temperature variations and changes in bias voltages.

Accordingly, it is an object of the present invention to provide an improved variable frequency magnetic-coupled multivibrator circuit in which the frequency of the output signal is continuously variable over a predetermined range.

Another object of the present invention is to provide a new and improved variable frequency magnetic-coupled multivibrator having an output signal free of random variations of period during each half-cycle of operation.

A further object of the present invention is to provide an improved variable frequency magnetic-coupled multivibrator having electronic on-off gating.

A still further object of this invention is to provide an improved magnetic-coupled feedback circuit for a variable frequency magnetic-coupled multivibrator.

Another object of the present invention is to provide a variable frequency magnetic-coupled multivibrator with improved operating stability over a wide range of temperatures and variations in bias voltages.

Still another object of this invention is to provide an improved variable frequency magnetic multivibrator having a temperature compensated full wave frequency control circuit for providing stable operation over a wide range of ambient temperature variations.

According to the present invention the foregoing and other objects are obtained by the provisions of a plurality of high remanence cores, a pair of circuit means including winding means linking said plurality of cores for effecting flux changes therein in opposite directions, output means responsive to the flux change in said cores, an electrical energy source connected across said pair of circuit means, and a variable frequency control circuit having full wave voltage limiting means coupled to all but one of said plurality of high remanence cores for limiting the magnitude of the flux change of said coupled cores. Each of the pair of circuit means contains a transistor switch which is controlled to render said pair of circuit means alternatively operative. The variable frequency control circuit also includes a variable unidirectional voltage supply which establishes the level of the limiting action obtained from the full wave voltage limiting means and correspondingly controls the multivibrator's frequency.

Figure 2:
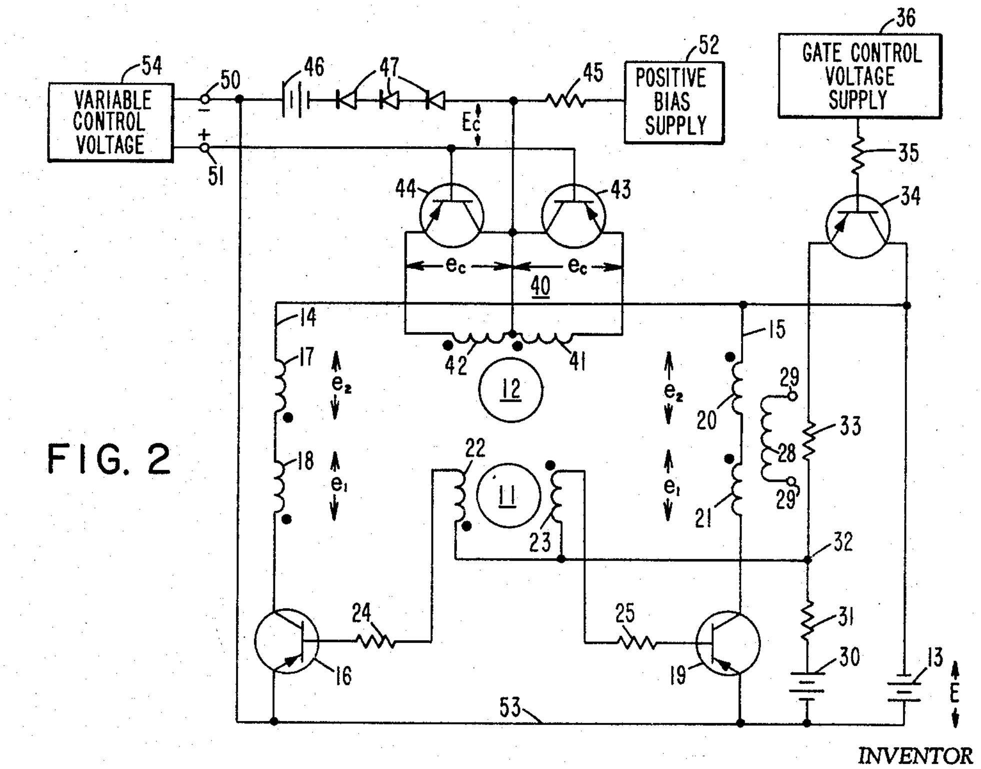

A more complete appreciation of the invention and many of the attendant advantages thereof will be readily apparent as the same becomes better understood by reference to the following detailed description when considered in connection with the accompanying drawing wherein:

FIG. 1 is a graphic illustration of the operational phases of the present invention; and FIG. 2 is a schematic view of an embodiment of the present invention.

In FIG. 1 there is graphically illustrated a substantially rectangular hysteresis loop which is exhibited by a magnetic material of the type generally used in constructing magnetic cores. Materials of this nature may generally be classified as square loop materials. The magnetizing force H, in ampere turns per unit length, that is applied to a core of magnetic material by a current carrying winding is shown on the abscissa axis of the graph of this figure. The resulting magnetic flux density B, in webers per square unit of area, established within the magnetic core by this magnetizing force is shown on the ordinate axis of the graph in FIG. 1. The "squareness" of the hysteresis loop is illustrated by its flat top, the essentially vertical sides of the loop, and the approximate equality of the induction difference between the two remanent states to the induction difference between the points of maximum applied magnetizing force.

If the magnetic core has previously been magnetized and a positive magnetizing force, H, of sufficient strength is applied thereto, the flux density within the core will reach a saturation level in one direction, which will be arbitrarily called the positive direction and is shown at $+B_S$ in FIG. 1. Upon the removal of this magnetizing force from the core, the flux retained in the core establishes a remanent flux density in the core material which is shown at $+B_R$ on the graph. A negative magnetizing force of sufficient magnitude when applied to the magnetic core will drive the core into saturation in the opposite direction, which will be called the negative direction, and is shown at $-B_S$ on the graph. After the removal of this magnetizing force, the remanent flux density established in the core material is shown at $-B_R$ in FIG. 1. Magnetic elements constructed with a material which exhibits these square loop characteristics and shaped, for example, in the form of simple toroids may be employed as the high remanence cores of this invention, as illustrated in FIG. 2.

The magnetizing force, H, that drives a magnetic material about its hysteresis loop is generally produced by a winding which is coupled to or encircles a portion of the magnetic material. By standard notation, a positive potential applied to the dotted end of a winding coupled to a core of magnetic material produces a positive magnetizing force which, if of sufficient magnitude, will provide a flux alignment within the magnetic core material in the positive direction. The flux change within the magnetic material produced by this magnetizing force will induce a voltage in the other windings of the magnetic material so that the dotted ends of these windings are negative with respect to the nondotted ends thereof. In terms of current, the application of current to the dotted end of a core winding produces a magnetizing force which switches the core. The resulting change of flux in the core induces a voltage in all the windings of the core in a direction which tends to drive a current out of the dotted ends of these windings.

Referring now to FIG. 2 wherein a specific embodiment of the improved variable frequency multivibrator according to the present invention is shown as including an uncontrolled toroidal core 11 and a controlled toroidal core 12, both of which are formed from a magnetic material that exhibits a substantially square loop hysteresis characteristic. In addition, there is included a unidirectional electrical energy source, such as the battery 13, and a pair of conductive loops or paths, 14 and 15, coupled across the battery 13. The inside diameters of the toroids 11 and 12 are preferably of identical size, although the cross-sectional areas thereof generally are designed, for reasons more fully explained below, so that core 12 is larger than core 11. Conductive loop 14 includes a switching element 16 and serially connected drive windings 17 and 18 individually linking the cores 12 and 11, respectively. The conductive loop 15 consists of a switching element 19 and serially connected drive windings 20 and 21 individually linking the magnetic cores 12 and 11, respectively.

The drive windings 17, 18 of conductive loop 14 and the drive windings 20, 21 of conductive loop 15 are poled to produce flux changes in opposite directions in each of the cores 11 and 12. Switching elements 16 and 19, such as for example PNP transistors, are used to perform a switching function and to keep each of the conductive loops alternatively operative, although it is to be understood that electron tubes can also be employed for this purpose. An output winding 28, which may either consist of a series connected winding individually linking each of the cores, or a single winding common to both cores, as shown, is provided to couple the generated square wave signal to the output terminals 29. Output signals may be obtained from only one core or from other portions of the described circuit, as desired. However, the above described output circuit has been found to produce exceptionally good results.

As is well known in the art, in the operation of a PNP type transistor as an on-off switching element the collector-emitter impedance of the transistor is very high when both the collector and emitter potentials are equal to, or more negative than, the base voltage. However, as soon as the base becomes slightly negative with respect to the emitter and positive with respect to the collector of the transistor, the collector to emitter impedance drops to a low value, and the transistor will start to conduct.

The uncontrolled core 11 is also linked by base windings 22 and 23, each of which has one end thereof connected to the junction 32 of serially connected resistors 31 and 33. The other end of base winding 22 is connected to the base of the transistor 16 through a current limiting resistor 24, and the other end of base winding 23 is connected to the base of transistor 19 through a current limiting resistor 25. The base windings 22 and 23 are poled the same as drive windings 18 and 21, respectively, so that there will be provided a positive base driving voltage to one switching transistor and a negative base driving voltage to the other transistor during each half cycle of multivibrator's operation thereby assuring that one of the switching transistors of conductive loops 14 and 15 will be on and the other switching transistor will be off for each half cycle of operation.

An electronic gate is provided for initiating and stopping the multivibrator's operation. This gate includes a switching element 34, such as for example a PNP transistor, a positive bias potential supply 30, bias resistors 31 and 33 serially connected between the positive terminal of supply 30 and the emitter electrode of switch 34, a source of negative potential, such as the bias supply 13 connected to the connector electrode of switch 34, and a gate control voltage supply 36 connected to the base electrode of the switch 34 through a base drive resistor 35. A rectangular gating waveform (not shown) having positive and negative portions is applied from the gate control supply 36 to control the conduction state of the transistor 34. The positive portion of the gating waveform maintains the transistor 34 in the off or high emitter-collector impedance state. As the bias return for base windings 22 and 23 is connected to the junction 32 between the resistors 31 and 33, the positive potential of battery 30 maintains both the switching transistors 16 and 19 in their off state. However, when the gating waveform becomes sufficiently negative, the transistor 34 is turned on which allows the junction 32 between resistor 31 and 33 to go negative and one of the switching transistors, 16 or 19, will begin to conduct.

Control of the multivibrator's frequency is accomplished by the frequency control circuit 40 which includes temperature compensation means and a full wave voltage limiter that is controlled by the level of a voltage that is applied to input terminals 50, 51 by a variable control voltage source 54 and the effect produced by the temperature compensation means. The full wave voltage limiter consists of serially connected identical control windings 41, 42 and control switching transistors 43, 44. The windings 41, 42 are coupled to the controlled core 12 to electrically form a single center tapped winding on this core. The collectors of the transistors 43, 44 are joined together and to the center tap junction of the serially connected windings 41, 42. The emitter electrode of the control transistor 44 is connected to the dotted end of control winding 42 and the emitter of control transistor 43 is connected to the nondotted end of control winding 41. The base electrodes of the transistors 43, 44 are both connected to the input terminal 51.

The temperature compensation means consists of a bank of thermal elements 47, a negative fixed bias supply 46 connected to one side of the thermal elements, a current limiting resistor 45 connected to the other side of the thermal elements and a positive bias supply 52 connected to the other end of resistor 45. The fixed negative bias supply 46 may be a battery, as illustrated in FIG. 2, or may be obtained from a potential drop across a resistor caused by a current flowing therethrough. The thermal elements 47 are of the type that exhibit a negative temperature coefficient of resistance such as, for example, thermistors or solid state germanium or silicon diodes. Alternatively the thermal elements may be a network of thermistors or a network of resistors and diodes which are selected to produce the required compensating bias for changing temperatures. The temperature compensation means is located in the frequency control circuit 40 by having the positive end of the fixed bias supply 46 connected to the input terminal 50 and the junction of the resistor 45 and thermal bank 47 connected to the joined collectors of control transistors 43, 44.

The multivibrator may be constructed with a common return line 53 which is illustrated as connecting the positive terminal of bias supply 13, the negative terminal of bias supply 30, the emitter electrodes of the transistors 16, 19 and the input terminal 50. A terminal of the other supplies illustrated in this figure may also be connected to the common return line 53, as required. The connection of the common return line to the terminal 50 may be omitted if it is desired that this terminal be free floating. Furthermore, the common return line may readily be grounded as is apparent to those skilled in the art.

The following explanation of the multivibrator's operation assumes that the multivibrator is operating at the designed standard temperature and therefore, the effect of the temperature compensation means on the multivibrator's operation is inconsequential. The manner of operation and the effect of the temperature compensation means on the frequency of the multivibrator will be more fully explained below.

In operation, the positive portion of the rectangular waveform applied to the gating transistor 34 from the gate control voltage supply 36 maintains the multivibrator in the off state. When the negative portion of the rectangular waveform is applied to the base of the transistor 34, the transistor conducts and the junction point 32 between the resistors 31 and 33 goes negative. The negative potential at 32 is applied to the base windings 22, 23 and provides a negative bias to the base electrodes of the switching transistors 16 and 19. Depending upon the unbalance of the conductive loops 14 and 15, one of the switching transistors in these loops will be gated on for the first half cycle of the multivibrator's operation and, subsequently, the other switching transistor will be gated on for the second half cycle of operation.

Assuming that for the first half cycle of operation transistor 19 conducts and that both cores are initially at the positive remanent point, $+B_r$, the application of a negative voltage to drive windings 20 and 21 produces a negative magnetizing force and a corresponding flux change in the cores 11 and 12. The changing flux in the core 11 induces a negative voltage at the dotted end of the base windings 22, 23 which maintains the transistor switch 19 in the on state and the transistor switch 16 in the off state.

A voltage, $e_c$, is also induced across each of the control windings 41, 42 of the core 12 such that the non-dotted ends of these windings are positive with respect to the dotted ends thereof. When the magnitude of the induced voltage, $e_c$, reaches a value so that the base electrode of control transistor 43 is negative with respect to the emitter electrode and positive with respect to the collector electrode, i.e., the emitter junction becomes forward biased, the control transistor 43 conducts and current flows in the winding 41. This flow of current produces a magnetizing force in core 12 which opposes the magnetizing force produced by the drive winding 20.

The frequency control circuit 40 coupled to core 12 limits the flux change in this core and assures that the value of the control winding induced voltage, $e_c$, during each half cycle of operation increases until it is equal to the magnitude of the voltage, $E_c$, that is applied to the base-collector electrodes of the control transistors 43, 44. Therefore, the value of the resultant magnetizing force which drives the core 12 around its hysteresis loop is determined by the algebraic sum of the drive winding produced magnetizing force and the magnetizing force produced by the current flow in the control windings. As the current flow in the control windings is regulated or controlled by the magnitude of the voltage $E_c$ it is readily seen that variations in the magnitude of the input control voltage, which sets the value of the voltage, $E_c$, will vary the flux change in this core 12. The cross-sectional area of core 12, the number of turns of the drive and control windings, the value of the fixed bias supply 13 and the input control voltage 54 determines the frequency of the multivibrator according to the relationship hereinafter noted.

The windings of core 12 and cross-sectional area thereof should be selected so that the maximum applied magnetizing force, i.e., when $E_c$ is a maximum value, will be insufficient to drive the core 12 to the flux saturation region in the negative direction, $-B_S$. Therefore, the flux change of core 12 will essentially be about the positive saturation region and along the linear vertical sides of the hysteresis loop. This insures a greater stability of operation of the multivibrator and allows the multivibrator to operate over a greater range of frequencies.

Control over the multivibrator frequency is accomplished by the frequency control circuit's effect over the voltages developed by the drive windings of the controlled and uncontrolled cores. This effect is accomplished by the transformer action between the windings of the controlled cores.

The voltage $e_2$ developed across the drive winding 20 is related to the control winding induced voltage $e_c$ by the transformer action of core 12 so that $$\frac{e_c}{n_c}=\frac{e_2}{n_2}$$

where $n_c$ is the number of turns of either winding 41 or 42, and $n_2$ is the number of turns of windings 20. The full wave voltage limiter thus insures that the voltage $e_c$ will equal $E_c$ for each half cycle of operation and that the voltage $e_2$ across the drive winding of core 12 will be equal to $$\frac{n_2}{n_c}E_c$$

Assuming that the voltage drop across the conducting transistor 19 is negligible, the voltage $e_1$ developed across drive winding 21 of core 11 is thus equal to $(E-e_2)$, where E is the value of the bias supply 13. As the full wave limiting circuit limits the value of $e_2$ to $$\frac{n_2}{n_c}E_c$$

the value of the input control voltage $E_c$ determines the value of $e_1$ the voltage that is developed across winding 21 and thus determines the magnitude of the negative magnetizing force and the flux change in core 11.

The negative magnetizing force produced by the winding 21 will, after a predetermined period of time, drive the core 11 into the negative saturation region which effectively reduces the negative voltage induced in winding 23 to zero and biases the transistor 19 off. This action removes the negative magnetizing force produced by the windings 20, 21 of the conductive loop 15 from both the cores 11 and 12. As core 12 is still switching when the negative magnetizing force is removed therefrom, the flux density of this core is at some value between the positive and negative remanence points. This value depends upon the level of the voltage $E_c$ and other fixed values such as the value of the fixed supply 13, the hysteresis loop characteristics of the core and the number of turns of the windings on the cores. However, as is well known in the art, upon the removal of the magnetizing force from core 11, this core will relax to the negative remanence state $-B_s$ thereby inducing a flyback voltage in all the windings of this core. This flyback voltage appears as a negative voltage at the nondotted end of windings of core 11 with respect to the dotted ends of these windings which, with the negative bias at point 32, biases the transistor 16 on for the second half cycle of operation.

In the same manner above described, current now flows in the conductive loop 14 and produces a positive magnetizing force and a corresponding change of flux in both the cores 11 and 12. The changing flux in core 11 induces a negative voltage at the nondotted end of the base winding 22 which maintains the transistor 16 in the on state for this half cycle of operation. The positive magnetizing force in core 12 induces a positive voltage at the dotted end with respect to the nondotted end of the core's winding and a negative voltage at the nondotted end with respect to the dotted end of these windings.

Limiting action in this half cycle is again determined by the magnitude of the base to collector voltage, $E_c$, but in this half cycle it is the control transistor 44, which is turned on to provide a path for current flow in the control winding 42. Again, the voltage $e_1$ which is now developed across the drive winding 18 is equal to $(E-e_2)$, and the voltage, $e_2$, developed across drive winding 17 is by the transformer action of core 12 equal to $$\frac{n_2}{n_c}E_c$$

The residual flux density of core 12 acts as a magnetic bias which aids to drive this core into positive saturation ahead of core 11. However, as the base driving windings 22 and 23 are only connected to core 11, the transistor switch 16 is maintained on until core 11 reaches the positive saturation region $+B_s$. When the flux of core 11 does saturate the voltage developed across winding 22 drops to zero and both the cores 11 and 12 relax back to the positive remanent state $+B_R$. In so doing the flyback voltage developed in the windings of core 11 turns the transistor 19 on, and the next half cycle of operation occurs in an identical fashion to the first half cycle of operation.

The manner in which the magnitude of the input control voltage varies the frequency of the multivibrator can be understood from the following relationships. The frequency F of the multivibrator is equal to $1/T$, where T is the period in seconds. From the relationship $$e_1=n_1\frac{d\phi_1}{dt}$$

it is seen that for each half cycle of operation $$e_1\int_0^{\frac{T}{2}}dt=n_1\int_{-\phi_R}^{+\phi_R}d\phi_1$$

The period of each half cycle $$\frac{T}{2}=\frac{n_1}{e_1}\Delta\phi_1$$

where $n_1$ is the number of turns of windings 18 or 21; $e_1$ is the voltage developed across windings 18 or 21; and $\Delta\phi_1$ is the total change of the flux density between $-B_R$ and $+B_R$ divided by the cross-sectional area of the core 11. That is $$\Delta\phi_1=\frac{\Delta B_1}{A_{11}}$$

where $A_{11}$ is the cross sectional area of the core 11, and $\Delta_{B1}$ is the induction difference between the two remanent states of core 11 which is approximately equal to twice the maximum induction difference between the two saturation regions of this core.

The voltage $e_1$ is determined by the value of $(E-e_2)$, and as E is a fixed value, variations in $e_2$ will correspondly change the value of $e_1$ and the period (or frequency) or the multivibrator. As previously explained, the voltage $e_2$ is equal to $$\frac{n_2}{n_c}E_c$$

and since both $n_2$ and $n_c$ are fixed values, $e_2$ is dependent upon the instantaneous magnitude of the control voltage $Ec$. Therefore, the voltage $e_1$ is equal to $$\left(E-\frac{n_2}{n_c}E_c\right)$$

and the frequency of the multivibrator is determined by the relationship:

$$F=\frac{E-\frac{n_2}{n_c}E_c}{2n_1\Delta\phi_1}$$

Since all the elements, except $E_c$, of the above equation are normally fixed, it is readily seen that linear variations in $Ec$ correspondingly varies the frequency of the multivibrator. It is also noted that the multivibrator frequency is determined entirely by the flux reversal in core 11. The function of core 12 is to control the voltage that is applied across the drive windings of the core 11.

The full wave voltage limiter of the frequency control circuit 40 eliminates the tendency of the multivibrator to operate at undesirable high frequency modes. To assure that this circuit operates consistently for each half cycle of operation it is necessary that the core 12 reaches positive saturation during the second half cycle of operation so that the starting point for the first half cycle is always from the positive remanent point. A resistor may be interposed between the nondotted end of winding 41 and the emitter of the control transistor 43 to accomplish this type of operation. This resistor will provide an unbalance to the full wave limiter such that $e_c$ is slightly greater than $Ec$ during the second half cycle which in turn will provide a slightly greater driving voltage, $e_2$, to the drive windings and therefore a slightly greater magnetizing force in the core 12.

The temperature compensation circuit operates to change the magnitude of the output voltage obtained from the variable control voltage source as it is applied to the base-collector electrodes of the control transistors 43, 44 with corresponding changes in ambient temperature. The multivibrator without temperature compensation operates such that as the ambient temperature increases the multivibrator frequency tends to increase, and correspondingly, a decrease in the ambient temperature decreases the multivibrator's frequency. This change in the multivibrator's operating frequency is due to changes in the characteristics of the circuit elements as the ambient temperature changes.

At the standard or designed temperature, the temperature compensation means is designed so that current flow through the bank of thermal elements 47 produces a voltage drop in opposition to the applied variable control voltage. The amount of current flow through these elements is regulated by the value of the voltage sources of the temperature compensation means and the value of the current limiting resistor 45. The potential drop produced by the current flow through the thermal elements is offset by the fixed negative bias supply 46 which is selected to provide a potential equal and opposite to the potential drop across the thermal elements 47 at standard or designed temperatures. As the potential difference due to the temperature compensation circuit between terminal 50 and the junction of the collector electrodes of the transistors 43, 44 is zero at this normal room temperature, the compensation circuit does not effect the operating frequency of the multivibrator since it does not effect the value of the input variable control voltage 54 that is applied to the base-collector circuit of the control transistors.

As the ambient temperature decreases below the value of the standard or designed temperature, the fixed bias 46 remains essentially constant, but the potential drop across the thermal elements 47 increases due to their negative temperature coefficient of resistance. A net potential drop is thus provided in series with and opposing the input control voltage which tends to decrease the magnitude of the control voltage that is applied to the collector-base electrodes of the control transistors 43, 44 thus tending to increase the frequency of the multivibrator. The compensation circuit elements are selected so that the increase in the multivibrator's frequency is equal to and thus opposes the tendency of the multivibrator frequency to decrease with a drop in temperature.

In a like manner, as the ambient temperature increases above the normal room temperature, the potential drop across thermal elements 47 decreases. The negative fixed bias 46 in conjunction with this decreased potential drop across the thermal elements 47 provides a net potential drop which is in series with and aiding the input control voltage. This aiding voltage tends to decrease the frequency of the multivibrator and thus opposes the tendency of the multivibrator frequency to increase with an increase in the ambient temperature.

The above described circuit is intended merely as an illustrative embodiment of the invention. Numerous other advantages, applications, and modifications of the invention will be apparent to those skilled in the art and are intended to be included within the scope of this invention. For example, PNP transistors have been illustrated in the description, but it is obvious that NPN transistors may be substituted to produce the same results with only minor modifications in the described circuit.

What is claimed is:

1. A multivibrator comprising first and second high remanence cores of a toroidal ring configuration, a unidirectional energy source, first and second flux changing windings wound in opposite rotational sense with respect to each other on both of said cores, first and second transistor switching means, said first flux changing windings and said first transistor switching means being serially connected to form a first loop across said energy source, said second flux changing windings and said second transistor switching means being serially connected to form a second loop across said energy source, a first base winding wound on said first core in the same rotational sense as said first flux changing windings, a second base winding wound on said first core in a rotational sense opposite to that of said first base winding, first impedance means, first circuit means serially connecting said first base winding and said first impedance means between the base electrode of said first transistor switching means and to said energy source, second impedance means, second circuit means serially connecting said second base winding and said second impedance means between the base electrode of said second transistor switching means and to said energy source, output means linking said cores, and full wave frequency control means coupled to said second core for limiting the rate of flux change in either direction in said second core.

2. A multivibrator according to claim 1 wherein said full wave frequency control means includes a pair of control transistors, first and second control winding means linking said second core and being connected across the emitter and collector electrodes of said pair of control transistors, and a source of a selectively variable unidirectional electrical signals connected to the base and collector electrodes of said pair of control transistors.

3. A multivibrator according to claim 2 including temperature compensation means interposed between said selectively variable unidirectional signal source and said pair of control transistors.

4. A multivibrator according to claim 2 including gating means interposed between the ends of said first and second base windings and said one side of said energy source, and temperature compensation means interposed between said pair of control transistors and said variable unidirectional signal source.

5. A multivibrator comprising a pair of high remanence cores of a toroidal ring configuration, a unidirectional electrical energy source, first and second flux changing windings wound in opposite rotational sense with respect to each other on each of said pair of cores, first and second switching means, said first flux changing windings and said first switching means being serially connected to form a first loop across said energy source, said second flux changing windings and said second switching means being serially connected to form a second loop across said energy source, third and fourth windings wound in the opposite rotational sense with respect to each other on one of said pair of cores, first circuit means serially connecting said third winding between said first switching means and said electrical energy source, second circuit means serially connecting said fourth winding between said second switching means and said electrical energy source whereby an alternate mode of operation is obtained from said first and second switching means, output means responsive to changes of flux within said pair of cores, and full wave frequency control means coupled to the other of said pair of cores for limiting the rate of flux change in either direction in said pair of cores.

6. A multivibrator according to claim 5, wherein said full wave frequency control means includes center tapped winding means linking said other core, a pair of signal translating means connected to said center tapped winding means, and a variable magnitude direct current voltage source connected to said pair of signal translating means whereby the magnitude of the voltage induced in said center tapped winding means due to flux changes in either direction of said other core is limited to the magnitude of the direct voltage source.

7. A multivibrator according to claim 6 wherein said frequency control means further includes temperature compensation means interposed between said pair of signal translating means and said variable magnitude direct current voltage source.

8. A multivibrator comprising first and second high remanence toroidal cores, first circuit means linking said cores and being operative to effect a flux change in said cores in one direction, second circuit means linking said cores and being operative to effect a flux change in said cores in the opposite direction, electrical energy supply means coupled across said first and second circuit means, switching means individual to and interposed in each of said first and second circuit means, third circuit means cooperating with said first core for rendering each of said switching means alternately operative, output means responsive to the flux changes in said cores, control winding means linking the second core, a source of selectively variable unidirectional potential, and a pair of signal translating means connected between said control winding means and said variable potential source for clamping the voltage induced in said control winding means in response to a flux change in either direction to a level determined by the instantaneous magnitude of said variable unidirectional potential source.

9. A multivibrator according to claim 8 wherein said third circuit means includes a first winding wound on said first core in one rotational sense, a second winding wound on said first core in the opposite rotational sense, and a pair of impedences, each of which individually connects one of said first and second windings to one of said switching means.

10. A multivibrator according to claim 8 including temperature compensation means interposed between said source of selectively variable unidirectional potential and said pair of signal translating means.

11. A multivibrator comprising a plurality of magnetic elements each of which exhibits a substantially square loop hysteresis characteristic, a pair of circuit means linking said plurality of magnetic elements for effecting flux changes therein in opposite directions, switching means interposed in each of said pair of circuit means for rendering each of said pair of circuit means alternately operative, means cooperating with at least one of said magnetic elements for effecting an alternate mode of operation of said switching means, output means responsive to the flux changes in said magnetic elements, a variable unidirectional electrical energy source, and full wave voltage limiting means coupled to at least one of the other of said magnetic elements and controlled by said variable unidirectional electrical energy source for limiting the magnitude of the flux change in either direction in the coupled magnetic elements correlative to the magnitude of the unidirectional electrical energy source.

12. A multivibrator according to claim 11 including temperature compensation means interposed between said variable unidirectional electrical energy source and said full wave voltage limiting means.

13. A multivibrator according to claim 12 further including gating means coupled to said cooperating means for initiating and stopping the operation of said multivibrator.

14. A multivibrator comprising a pair of high remanence toroidal cores, first circuit means linking said pair of cores and being operative for effecting a flux change in said pair of cores in one direction, second circuit means linking said pair of cores and being operative for effecting a flux change in said pair of cores in the opposite direction, switching means interposed in said first and second circuit means for rendering said first and second circuit means alternately operative, third circuit means linking one of said pair of cores for rendering said switching means alternately on and off, output means responsive to the flux changes in said pair of cores, center tapped control winding means wound on the other of said pair of cores, a variable unidirectional potential energy source, and a pair of control elements intercoupling said center tapped control winding and said variable energy source for establishing the rate of flux change in either direction in the other of said pair of cores correlative to the magnitude of said variable potential energy source.

15. A multivibrator according to claim 14 including temperature compensation means interposed between said variable unidirectional potential energy source and said pair of control elements.

16. A multivibrator comprising a controlled magnetic element and an uncontrolled magnetic element, a pair of circuit means linking said controlled and uncontrolled magnetic elements for producing flux changes in opposite directions within said magnetic elements, switching means interposed in each of said pair of circuit means, means cooperating with said uncontrolled element for effecting an alternate mode of operation of said switching means, and variable controlled voltage limiting means associated with said controlled magnetic element for setting the degree of flux change in both directions of said controlled magnetic element whereby the frequency of said multivibrator is variably controlled.

17. A multivibrator comprising controlled magnetic means and uncontrolled magnetic means, a pair of circuit means linking said controlled and uncontrolled magnetic means for effecting flux changes in opposite directions within said magnetic means, means associated with the flux change of said uncontrolled magnetic means for effecting an alternate mode of operation of said pair of circuit means, output means responsive to changes of flux within said magnetic means, and variable frequency control means associated with said controlled magnetic means for limiting the magnitude of flux change in both directions in said controlled magnetic means.

References Cited in the file of this patent

UNITED STATES PATENTS

| | | |
|---|---|---|
| 2,866,178 | Lo et al. | Dec. 23, 1958 |
| 3,078,380 | Ingman | Feb. 19, 1963 |

OTHER REFERENCES

Publication I: "Clock Pulses Generated by Magnetic Core Timer," Electronic Design, September 13, 1961.